No. 884,465. PATENTED APR. 14, 1908.
F. S. CHASE.
HARVESTER REEL.
APPLICATION FILED AUG. 5, 1907.
2 SHEETS—SHEET 2.
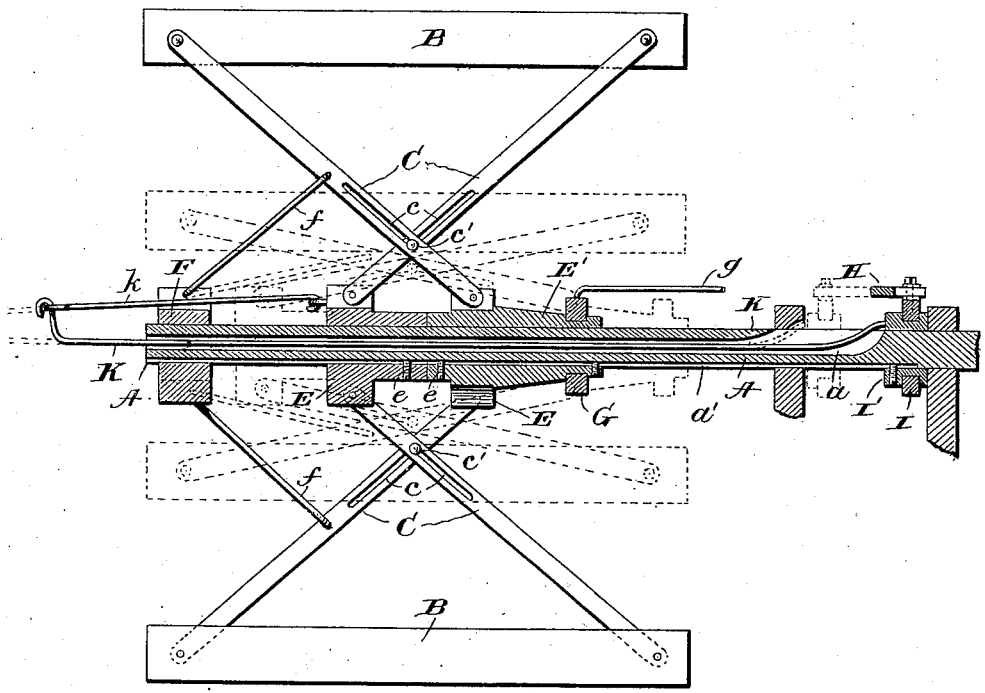
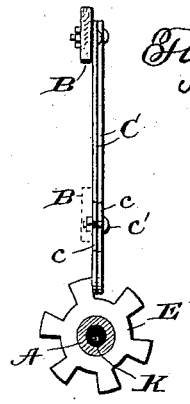

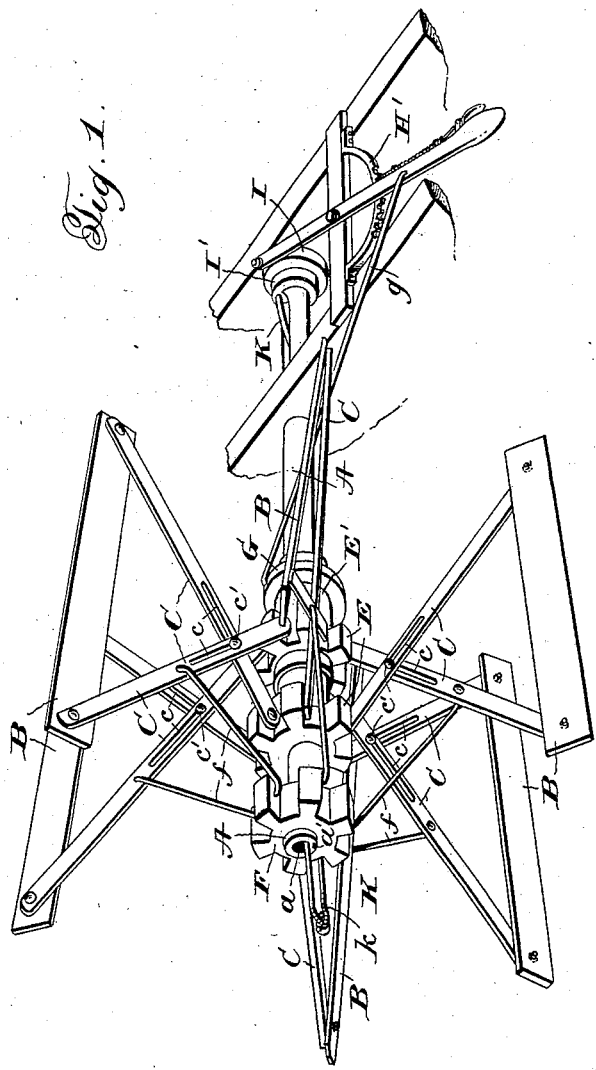

UNITED STATES PATENT OFFICE.

FRANK S. CHASE, OF BLOOMINGTON, INDIANA.

HARVESTER-REEL.

No. 884,465.  Specification of Letters Patent.  Patented April 14, 1908.

Application filed August 5, 1907. Serial No. 387,101.

*To all whom it may concern:*

Be it known that I, FRANK S. CHASE, a citizen of the United States, residing at Bloomington, in the county of Monroe and State of Indiana, have invented certain new and useful Improvements in Harvester - Reels, of which the following is a specification, reference being had therein to the accompanying drawing.

This invention relates to an improvement in harvester reels, and the object of the invention is the provision of a reel of this character, the blades or wings of which may be radially adjusted so as to be capable of use on grain of varying heights.

A further object of the invention is the provision of simple and efficient means for effecting the adjustment of the wings or blades of the reel so that the same may be adjusted and locked in any desired position by the operator without stopping the machine.

A further object of the invention is the provision of a reel of this character which may be wholly collapsed when the machine is being transported from place to place.

Other objects of the invention will be apparent from the detailed description hereinafter when read in connection with the accompanying drawings forming a part hereof wherein a preferable embodiment of my invention is shown and wherein like numerals of reference refer to similar parts in the several views.

In the drawings: Figure 1 is a perspective view of my improved reel, the blades or wings thereof being shown in their extended position. Fig. 2 is a longitudinal section of the same, the folded positions of the blades being indicated in dotted lines, and Fig. 3 is a detail view.

Referring now more particularly to the drawings, A designates the reel shaft which is adapted to be rotated in the usual manner when the harvester is operated, and the outer end of which is provided with an axial opening $a$ therein extending for a considerable portion of the length thereof.

B designates the wings or blades of the reel, each of which is supported by a pair of crossed arms C C, the upper ends of which are pivotally connected to the blade or wing adjacent the ends thereof and the lower ends of which are pivotally connected to a pair of collars E E which are slidably mounted on the shaft A. The collars E E are provided with suitable keys $e$ which engage a spline $a'$ which extends longitudinally of the shaft A, so that said collars will rotate with said shaft but are free to slide longitudinally thereof. The arms C C are provided with longitudinally extending slots $c$ adjacent the crossing points thereof, and the arms of each pair of said arms are connected by bolts $c'$ which pass through the slots $c$ thereof at their point of crossing.

Rigidly secured to the outer end of the shaft A is a collar F, which collar is connected with the adjacent arm of each pair of arms C C by means of a plurality of links or braces $f$, the opposite ends of said links or braces being pivotally connected respectively to said collar and said arms. The innermost one of the collars E E splined on the shaft A is provided with an elongated sleeve E' projecting from one side thereof and rotatably mounted on said sleeve is a collar G, which collar is connected by a suitable link $g$ with an operating lever H which is fulcrumed at any suitable point on the harvester within easy reach of the operator.

H' designates a rack of any suitable construction, with which a suitable pawl carried by the lever H is designed to coöperate so that said lever may be locked in any desired position of adjustment. The end of the lever H is pivotally connected to a collar I, which is rotatably mounted on a sleeve I', which is splined on the shaft A so as to rotate therewith and to slide longitudinally thereof. Positioned within the axial opening $a$ in the shaft A is a rod K, the inner end of which projects through a suitable slot or opening in the shaft A and is secured to the sleeve I' in any suitable manner and the outer end of which projects beyond the outer end of the shaft A and has loosely connected thereto one end of a link $k$, the opposite end of which link is connected in any suitable manner to the outermost one of the sleeves E E.

From the above described construction, it will be obvious that by manipulating the lever H, the collars E E may be shifted in opposite directions on the shaft A to reduce the diameter of the reel to any desired extent according to the height of the grain which is being harvested or to effect the total collapse of the reel. It will be obvious that such adjustment may be effected during the operation of the machine.

I do not desire to limit myself to the precise form and construction shown in the drawings, as it is obvious that many minor changes may be made thereto without departing from the spirit of the invention as defined in the appended claims.

Having thus described the invention, what is claimed is:—

1. In a harvester reel, a shaft, a pair of collars mounted on said shaft and adjustable longitudinally thereof, a plurality of blades, and a pair of crossed arms connecting each of said blades and said collars.

2. In a harvester reel, a shaft, a pair of collars slidably mounted on said shaft, a plurality of blades and a pair of crossed arms connecting each of said blades and said collars, said arms being provided with a loose connection at the crossing points thereof.

3. In a harvester reel, a shaft, a pair of collars slidably mounted on said shaft, a plurality of blades a pair of crossed arms connecting each of said blades and said collars, and means for simultaneously shifting said collars in opposite directions on said shaft.

4. In a harvester reel, a shaft, a pair of collars slidably mounted on said shaft, a plurality of blades, a pair of crossed arms connecting each of said blades and said collars, a lever for simultaneously shifting said collars in opposite directions on said shafts, and means for locking said lever in various positions of adjustment.

5. In a harvester reel, a shaft, a pair of collars splined on said shaft, a plurality of blades connecting said arms and said collars, said blades being provided with longitudinal slots adjacent the crossing points thereof bolts passing through the slots of each pair of said arms at the crossing point thereof, and means for adjusting said collars on said shaft.

6. In a harvester reel, a shaft, a pair of collars mounted on said shaft and adjustable longitudinally thereof, a plurality of blades, a pair of crossed arms connecting each of said blades and said collars, and a plurality of links having their ends pivotally connected respectively to said shaft and to one arm of each of said pairs of arms.

7. In a harvester, a frame, a shaft journaled therein, a pair of collars slidably mounted on said shaft, a plurality of blades, a pair of crossed arms connecting each of said blades and said collars, a lever fulcrumed on the harvester frame, and connections between said collars and said lever on opposite sides of the fulcrum thereof.

8. In a harvester, a frame, a shaft journaled therein, a pair of collars slidably mounted on said shaft a plurality of blades, a pair of crossed arms connecting each of said blades and said collars, a lever fulcrumed on the frame, links connecting said collars with said lever on opposite sides of the fulcrum thereof, and means for holding said lever in various positions of adjustment.

9. In a harvester, a frame, a shaft journaled therein and provided with a tubular outer end, a pair of collars keyed to said shaft and longitudinally adjustable thereon, one of said collars being provided with an elongated sleeve, a rotatable collar mounted on said sleeve, a plurality of blades, a pair of crossed arms connecting each of said blades and the collars keyed to said shaft, a rod positioned within the tubular portion of said shaft and projecting beyond the outer end thereof, a link connecting the outer end of said rod and the adjacent collar keyed on said shaft, a lever fulcrumed on said frame and connected at one side of the fulcrum thereof with the inner end of said rod, and a connection between said lever on the other side of the fulcrum thereof and the rotatable collar mounted on the sleeve of the other collar splined on said shaft.

In testimony whereof I affix my signature in presence of two witnesses.

FRANK S. CHASE.

Witnesses:
W. W. COGSWELL,
H. C. BRUNER.